(12) United States Patent
Umezu et al.

(10) Patent No.: US 7,770,027 B2
(45) Date of Patent: Aug. 3, 2010

(54) SEMICONDUCTOR MEMORY DEVICE

(75) Inventors: Ryuji Umezu, Kyoto (JP); Ikuo Yamaguchi, Kanagawa (JP)

(73) Assignees: Nintendo Co., Ltd., Kyoto (JP); MegaChips Corporation, Osaka (JP)

( * ) Notice: Subject to any disclaimer, the term of this patent is extended or adjusted under 35 U.S.C. 154(b) by 1371 days.

(21) Appl. No.: 11/203,263

(22) Filed: Aug. 15, 2005

(65) Prior Publication Data

US 2006/0107072 A1  May 18, 2006

Related U.S. Application Data

(60) Provisional application No. 60/627,908, filed on Nov. 16, 2004.

(30) Foreign Application Priority Data

Nov. 15, 2004 (JP) ............... 2004-330570

(51) Int. Cl.
*G06F 21/00* (2006.01)

(52) U.S. Cl. ............... 713/193; 713/192; 711/E12.092; 726/16

(58) Field of Classification Search ......... 713/182–193, 713/163; 717/141, 127; 705/56; 380/277, 380/46, 43; 711/164, E12.092; 726/16
See application file for complete search history.

(56) References Cited

U.S. PATENT DOCUMENTS

| | | | | |
|---|---|---|---|---|
| 4,525,599 A | * | 6/1985 | Curran et al. | ............... 713/190 |
| 4,583,196 A | * | 4/1986 | Koo | ............... 726/16 |
| 5,016,275 A | * | 5/1991 | Smith | ............... 380/43 |
| 5,666,516 A | | 9/1997 | Combs | |
| 5,761,698 A | | 6/1998 | Combs | |
| 5,765,197 A | | 6/1998 | Combs | |
| 5,838,613 A | | 11/1998 | Takizawa | |
| 5,933,854 A | | 8/1999 | Yoshimura | |
| 6,122,716 A | | 9/2000 | Combs | |
| 6,173,358 B1 | | 1/2001 | Combs | |
| 6,598,166 B1 | * | 7/2003 | Folmsbee | ............... 713/190 |
| 6,661,694 B2 | | 12/2003 | Kund et al. | |

(Continued)

FOREIGN PATENT DOCUMENTS

EP         660215 A2    6/1995

(Continued)

OTHER PUBLICATIONS

Mar. 23, 2007 Office Action and Report on Search (with translation) issued in foreign counterpart (7 pages).

(Continued)

*Primary Examiner*—Taghi T Arani
*Assistant Examiner*—Jason Lee
(74) *Attorney, Agent, or Firm*—Nixon & Vanderhye P.C.

(57) ABSTRACT

A semiconductor memory includes a memory control section and a memory core section. A command judgment circuit in the memory control section changes the operating mode of the semiconductor memory in response to a command sent from a controller of an information processing apparatus. In a first mode, a decryption process is performed in a command decryption circuit, and data outputted from the memory core section is not scrambled. In a second mode, the decryption process is not performed in the command decryption circuit, and the command outputted from the memory core section is scrambled.

18 Claims, 7 Drawing Sheets

U.S. PATENT DOCUMENTS

| | | |
|---|---|---|
| 2002/0029345 A1 | 3/2002 | Kawasaki et al. |
| 2003/0140206 A1* | 7/2003 | Yoneda et al. .............. 711/163 |
| 2003/0200406 A1* | 10/2003 | Kouno ....................... 711/164 |
| 2004/0161106 A1* | 8/2004 | Matsuda et al. ............... 380/46 |
| 2004/0223618 A1* | 11/2004 | Dellow ....................... 380/277 |

FOREIGN PATENT DOCUMENTS

| | | |
|---|---|---|
| EP | 1172731 A1 | 1/2002 |
| JP | 1-270191 | 10/1989 |
| JP | 7-200287 | 8/1995 |
| JP | 7-219852 | 8/1995 |
| JP | 8-328962 | 12/1996 |
| JP | 09-106690 | 4/1997 |
| JP | 2001-35171 | 9/2001 |
| JP | 2002-32268 | 1/2002 |
| KR | 0178622 B | 4/1999 |
| TW | 391004 | 5/2000 |

OTHER PUBLICATIONS

Extended European search report issued in foreign counterpart (Dec. 3, 2008).

* cited by examiner

F I G . 3
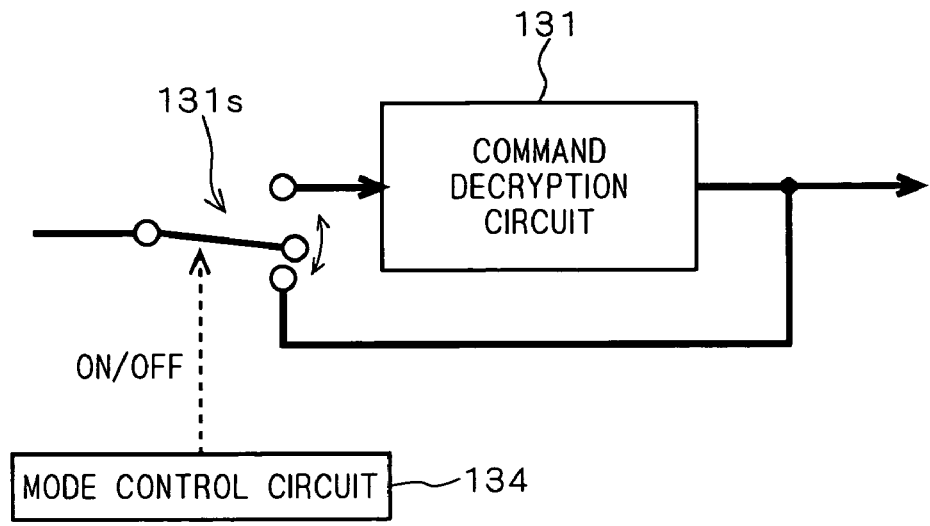
F I G . 4
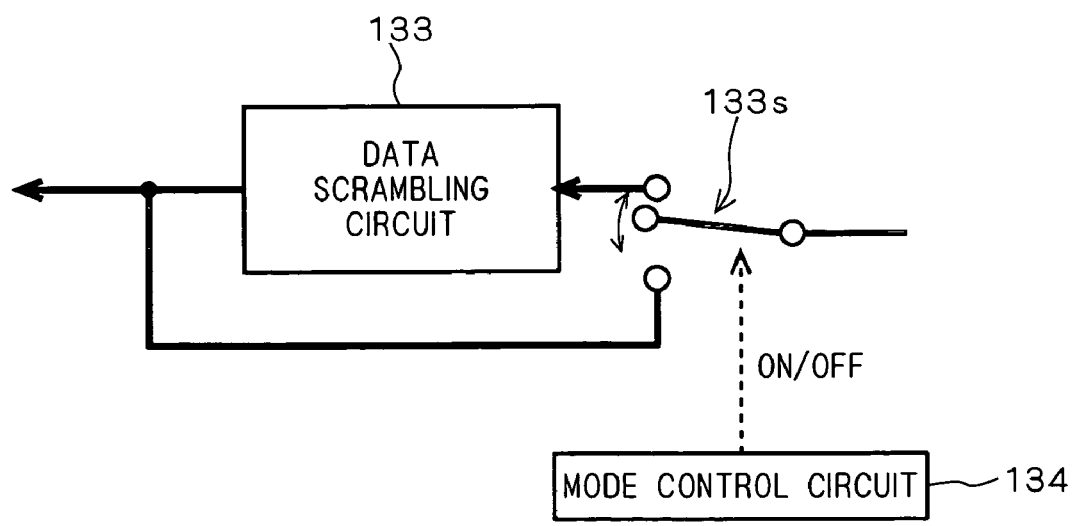

F I G . 6
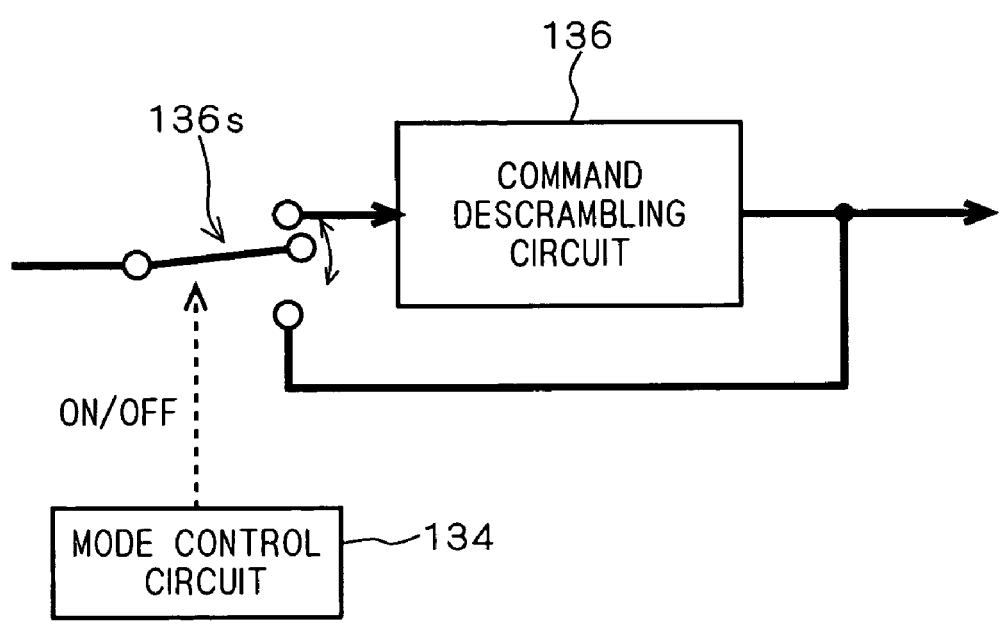

SEMICONDUCTOR MEMORY DEVICE

CROSS-REFERENCES TO RELATED APPLICATIONS

This application is a U.S. utility application claiming priority to U.S. Provisional Application No. 60/627,908 filed 16 Nov. 2004 and JP 2004-330570 filed 15 Nov. 2004, the entire contents of each of which are hereby incorporated by reference.

FIELD

The technology herein relates to a semiconductor memory device and, more particularly, to the security of various data stored in a semiconductor memory.

BACKGROUND AND SUMMARY

An information processing apparatus has been known which includes a semiconductor memory removable therefrom and which operates using data containing a program stored in the semiconductor memory. A variety of mechanisms have been proposed to provide the security of the data stored in this semiconductor memory.

Japanese Patent Application Laid-Open No. 9-106690 (1997) discloses a technique for scrambling data outputted from a semiconductor memory by the use of key data to provide the security of the data.

Japanese Patent Application Laid-Open No. 2001-35171 or Japanese Patent Application Laid-Open No. 7-219852 (1995) discloses a technique of performing a type of encryption by means of a logic circuit (logic) on address data outputted to a semiconductor memory or data outputted from the semiconductor memory to provide the security of the data.

Japanese Patent Application Laid-Open No. 9-106690, however, discloses a security method using a scrambling scheme which is advantageous in high data transfer efficiency but is disadvantageous in generally low strength of security. Japanese Patent Application Laid-Open No. 2001-35171 or Japanese Patent Application Laid-Open No. 7-219852 employs a one-step logic operation by means of the logic circuit, which features fast processing but is disadvantageous in low confidentiality because it is easy to analyze the security method if what logic circuit is used is known. To improve the confidentiality, it is contemplated to use an encryption scheme such that an inexpensive processing circuit such as a single-chip microcomputer is inserted between the semiconductor memory and the information processing apparatus to process a cryptographic algorithm. The security method employing such an encryption scheme, however, is disadvantageous in low data transfer efficiency although having the advantage of its high strength of security.

The technology herein is intended for a semiconductor memory device removably mounted to an information processing apparatus. According to an exemplary illustrative non-limiting implementation, the semiconductor memory device comprises: a memory core section for storing therein data including a program to be protected, the memory core section including an address input section and a data output section; an input/output terminal section including command input terminals for receiving a command including an instruction code and address data from the information processing apparatus, and data output terminals for providing data read from the memory core section to the information processing apparatus; and a memory control means connected between the memory core section and the input/output terminal section, the memory control means including a command decryption means selectively operative to decrypt the command provided to the command input terminals or to output the command without processing, a scrambling means selectively operative to scramble the data read from the memory core section or to output the data without processing, a command judgment means for judging whether the command provided from the information processing apparatus is a first command specifying a transition to a first operating mode or a second command specifying a transition to a second operating mode, and an operating mode control means selecting the first operating mode for enabling a command decryption function of the command decryption means in response to a judgment made by the command judgment means that the command is the first command, and selecting the second operating mode for enabling a scrambling function of the scrambling means in response to a judgment made by the command judgment means that the command is the second command.

Preferably, the memory control means includes a descrambling means selectively operative to pass the command provided to the command input terminals without processing therethrough or to descramble the command, and the operating mode control means disables a descrambling function of the descrambling means when the first operating mode is selected.

Preferably, the operating mode control means enables the descrambling function of the descrambling means when the second operating mode is selected.

The exemplary illustrative non-limiting implementation has the plurality of operating modes different in security strength, and operates while changing between these operating modes to provide the semiconductor memory device with enhanced security strength and excellent read performance.

Preferably, the memory control means includes a register for setting a scrambling condition of the scrambling means, and the operating mode control means updates the contents of the register during an operation in the first operating mode.

Preferably, the semiconductor memory device is controlled by a command provided from the information processing apparatus so that a period of operation in the first operating mode is longer than a period of operation in the second operating mode.

The semiconductor memory device according to the exemplary illustrative non-limiting implementation initializes the condition of scrambling processing when in a mode in which encryption is used and security strength is high while operating mainly in a mode in which scrambling is used and security strength is low. This efficiently compensates for the strength of the security in the mode in which the security strength is low, to provide excellent read performance on average for all of the operating modes.

It is therefore an object of the exemplary illustrative non-limiting implementation to provide a semiconductor memory having a high-level security function and excellent read performance in consideration for a balance between the strength of security and data transfer efficiency.

BRIEF DESCRIPTION OF THE DRAWINGS

These and other features and advantages will be better and more completely understood by referring to the following detailed description of exemplary non-limiting illustrative implementations in conjunction with the drawings of which:

FIG. 3 is a specific block diagram of an exemplary illustrative non-limiting command decryption circuit;

FIG. 4 is a specific block diagram of an exemplary illustrative non-limiting data scrambling circuit;

FIG. 6 is a specific block diagram of an exemplary illustrative non-limiting command descrambling circuit;

DETAILED DESCRIPTION

Figure 1:
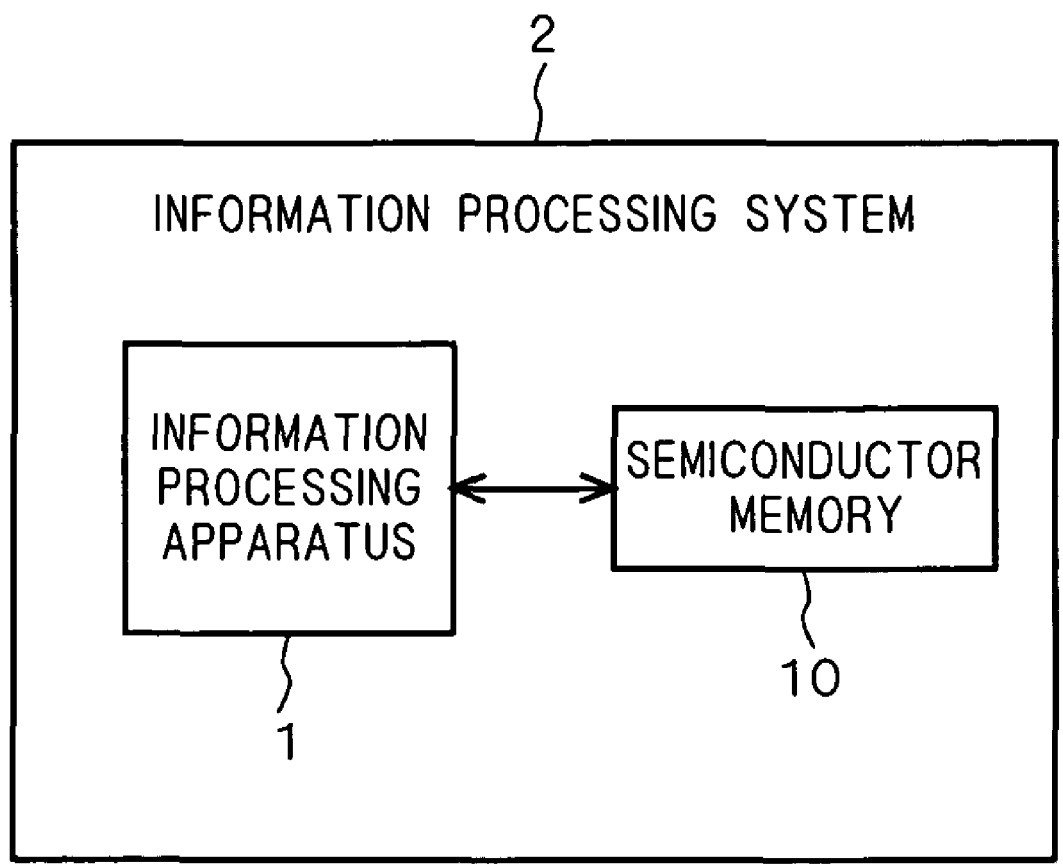
FIG. 1 is a general drawing of an exemplary illustrative non-limiting information processing apparatus.

Exemplary illustrative non-limiting implementations will now be described with reference to the drawings. FIG. 1 is a diagram showing a relationship between an exemplary illustrative non-limiting semiconductor memory device 10 and an information processing apparatus 1 to which the exemplary semiconductor memory device 10 is applied. In the exemplary illustrative non-limiting implementation, the semiconductor memory device (hereinafter referred to simply as a "semiconductor memory") 10 is a nonvolatile memory (for example, a ROM, a flash memory or the like) removable from the body of the information processing apparatus 1. The semiconductor memory 10 fixedly stores therein various data including a program, image data, music data and the like the confidentiality of which must be protected from unauthorized duplication or unauthorized reading. The information processing apparatus 1 includes a CPU and a RAM, and executes a variety of information processing depending on the data stored in the ROM by replacing the semiconductor memory 10. The semiconductor memory 10 and the information processing apparatus (or the information processing apparatus body) 1 constitute an information processing system 2.

{First Exemplary Illustrative Non-Limiting Implementation}

Figure 2:
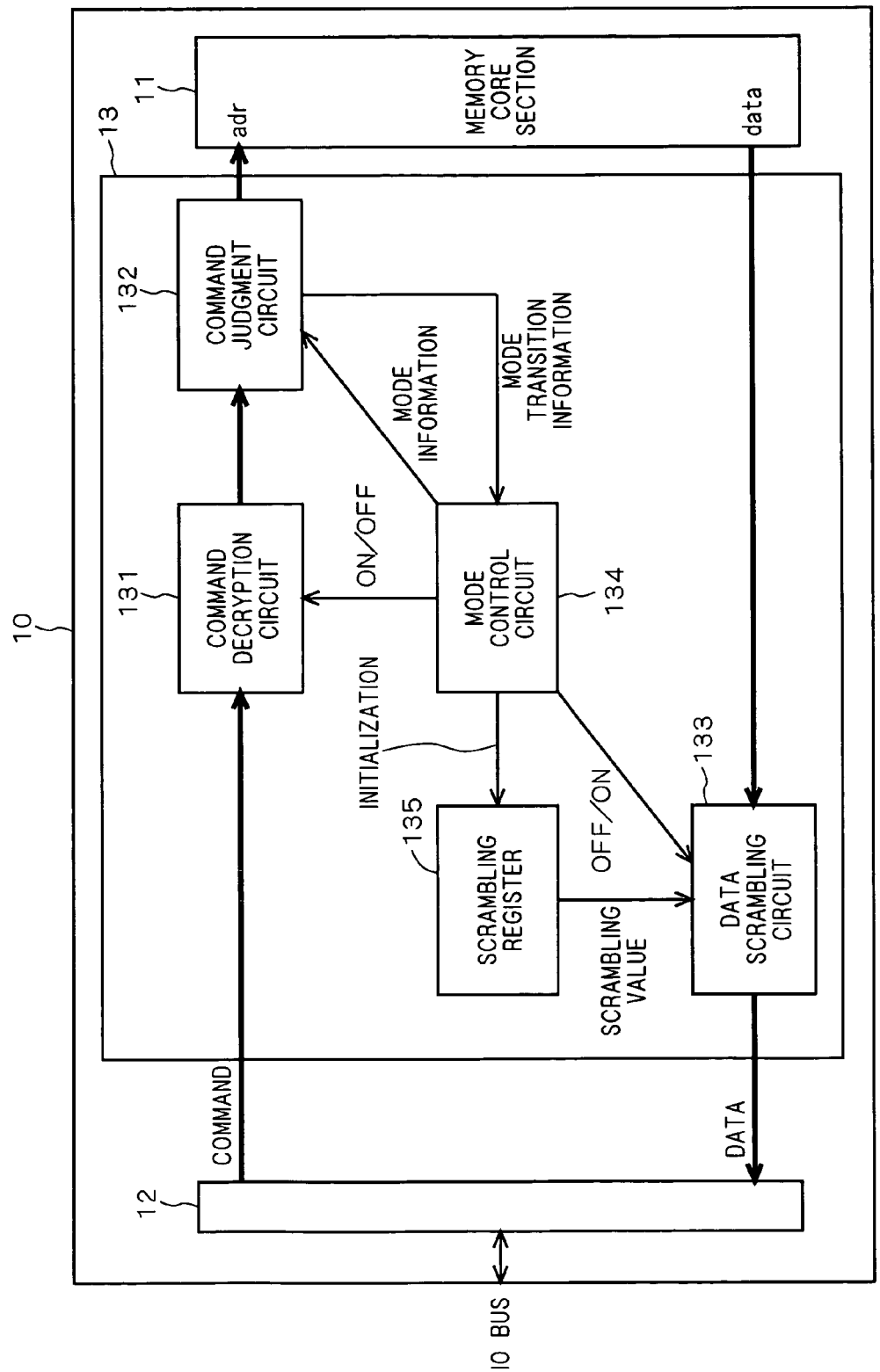
FIG. 2 is a circuit block diagram of an exemplary illustrative non-limiting semiconductor memory.

Next, the construction of the semiconductor memory 10 according to a first exemplary implementation will be described. FIG. 2 is a circuit block diagram of the semiconductor memory 10. The semiconductor memory 10 includes a memory core section 11 and an input/output terminal section 12. The semiconductor memory 10 provides the security of data stored in the memory core section 11 by inserting a memory control section 13 between the memory core section 11 and the input/output terminal section 12.

The input/output terminal section 12 includes command input terminals for receiving a command provided from the information processing apparatus 1, and data output terminals for outputting data read from the memory core section 11. The command input terminals receive a command provided from the information processing apparatus 1 through command buses (sometimes referred to generally as address buses). The data output terminals are connected to data buses of the information processing apparatus 1. When the information processing apparatus 1 is of the type which uses common buses serving as both the command buses and the data buses and which outputs or inputs commands and data by switching therebetween in a time-sharing manner, dual-purpose (common) terminals are used in terms of hardware as both the command input terminals and the data output terminals. In this case, if the number of bits of a command and data is greater than the number of terminals, the command or data is provided in a plurality of divided parts.

The command provided from the information processing apparatus 1 contains an instruction code and address data. Thus, the command input terminals are terminals for receiving the instruction code given through the command buses and the address data given through the address buses. The data output terminals are terminals for outputting data outputted from the memory core section 11 to the data buses.

All or at least one of the command input terminals doubles as all or at least one of the data output terminals. The terminals are used in a time-sharing manner differently at the time of the input of a command and at the time of the output of data. Such a construction can reduce the number of bus lines for connection between the information processing apparatus 1 and the semiconductor memory 10.

The command includes a read command for the information processing apparatus 1 to read the data stored in the memory core section 11, and an operating mode switching command for the information processing apparatus 1 to control the operating modes of the semiconductor memory 10. The data stored in the memory core section 11 includes various data such as a program, image data, voice data, game data and the like. The memory control section 13 is a circuit for controlling access to the data stored in the memory core section 11, and has the function of ensuring the security of the data.

The memory control section 13 of the exemplary illustrative non-limiting implementation of FIG. 2 includes a command decryption circuit 131, a command judgment circuit 132, a data scrambling circuit 133, a mode control circuit 134, and a scrambling register (hereinafter referred to simply as a "register") 135. The memory core section 11 is a storage region containing a multiplicity of memory cells and the like. An inexpensive mask ROM is used for the memory core section 11, but the memory core section 11 is not limited to this. A nonvolatile memory including a flash memory, an EPROM and the like may be used for the memory core section 11.

The command decryption circuit 131 is a circuit selectively operative to decrypt a command received from the information processing apparatus 1 or to output the command without processing. The data scrambling circuit 133 is a circuit selectively operative to perform a scrambling process on data outputted from the memory core section 11 or to output the data without processing. Thus, an encryption process is performed on a command provided from the information processing apparatus 1 to the semiconductor memory 10 for the purposes of protecting the confidentiality of the command and consequently controlling access to the semiconductor memory 10. Further, a scrambling process is performed on data to be outputted from the semiconductor memory 10 to the information processing apparatus 1 for the purpose of protecting the confidentiality of the data.

The encryption process, as that term is used herein, does not include the scrambling process (bit manipulation) on address buses and data buses. In contrast with the scrambling process which makes information unintelligible by means of the bit manipulation, the encryption process according an exemplary illustrative non-limiting implementation is the process of encrypting the command itself containing a bit operation on a bit-by-bit basis. For example, an encryption scheme belonging to a secret key cryptosystem (also referred to as a common key cryptosystem) may be adopted for the encryption process according to an exemplary illustrative non-limiting implementation.

FIG. 3 shows a specific construction of the command decryption circuit 131. A bus switching circuit 131s is provided at the input circuit of the command decryption circuit 131. The bus switching circuit 131s is constructed for selection as to whether to output a command through the command decryption circuit 131 or to output the command without processing in response to a switching control signal provided from the mode control circuit 134. Specifically, when the switching control signal which turns ON a command decryption function is provided from the mode control circuit 134, the command inputted from the input/output terminal section 12 is provided to the command decryption circuit 131, and the command decryption function is activated (or enabled). On the other hand, when the switching control signal which turns OFF the command decryption function is provided from the mode control circuit 134, the command inputted from the input/output terminal section 12 is outputted through a bypass line so as to pass without processing, whereby the command decryption function is deactivated (or disabled). Thus, the command decryption circuit 131 is controlled to be ON/OFF by the switching control signal. A specific construction of the command decryption circuit 131 is such that a circuit for performing a bit operation on one unit of data (for example, one byte or a predetermined number of bytes) is used to perform a computing process (decryption process) which is the reverse of encryption. An example of the circuit for performing the bit operation includes a circuit for performing logic operations on one unit of data (for example, one byte or a predetermined number of bytes) in a plurality of steps by the use of logic circuits (AND, OR, NAND, exclusive-OR and the like). Another example of the command decryption circuit 131 may be a circuit which performs a simple decryption algorithm computation by the use of a small-scale CPU such as a single-chip microcomputer.

FIG. 4 shows a specific construction of the data scrambling circuit 133. A bus switching circuit 133s is provided also at the input circuit of the data scrambling circuit 133. The bus switching circuit 133s is constructed for selection as to whether to output data read from the memory core section 11 through the data scrambling circuit 133 or to output the read data without processing in response to a switching control signal provided from the mode control circuit 134. Specifically, when the switching control signal which turns ON a data scrambling function is inputted from the mode control circuit 134, the data read from the memory core section 11 is outputted through the data scrambling circuit 133. When the switching control signal which turns OFF the data scrambling function is inputted, the data read from the memory core section 11 is outputted through a bypass line so as to pass without processing, whereby the data scrambling function is deactivated (or disabled). Thus, the data scrambling circuit 133 is controlled to be ON/OFF by the switching control signal. A specific example of the data scrambling circuit 133 may be a circuit which performs bit replacement or bit manipulation such as bit operation or bit inversion, in accordance with certain regularity.

The command judgment circuit 132 judges the descriptions of a command provided from the information processing apparatus 1 to output data for transition of the operating modes. When the command is a data read command for reading data stored in the memory core section 11, the command judgment circuit 132 provides a read control signal decrypted by the command decryption circuit 131 to the memory core section 11, and provides the command given through the command decryption circuit 131 as a read address to the memory core section 11. Additionally, the command judgment circuit 132 judges whether or not the decrypted command is a command for switching control of the operating modes to be described later, and provides mode transition information to the mode control circuit 134. The command which gives rise to the mode transition information is generated by the CPU of the information processing apparatus 1. The generation of the command which gives rise to the mode transition information is timed uniquely by the CPU of the information processing apparatus 1 and is responsive to the read of part of the program stored in the memory core section 11.

The mode control circuit 134 effects the ON/OFF control of the command decryption circuit 131 and/or the data scrambling circuit 133 in accordance with the result of the judgment of the command by the command judgment circuit 132 to control the switching of the operating modes of the semiconductor memory 10, consequently effecting the access control of the memory core section 11. The mode control circuit 134 also has the function of performing an initialization process on the scrambling register (hereinafter referred to simply as a "register") 135, and sets a scrambling value prior to the scrambling operation of the data scrambling circuit 133.

The semiconductor memory 10 is switchable between two operating modes shown in Table 1.

TABLE 1

| Mode | Command Decryption Circuit | Data Scrambling Circuit |
|---|---|---|
| First Mode | ON | OFF |
| Second Mode | OFF | ON |

These two operating modes are controlled by the command provided from the information processing apparatus 1 as described above. When the command for switching control of the operating modes is provided from the information processing apparatus 1, the command judgment circuit 132 judges the command. When the command judgment circuit 132 judges that the command is the command for switching control of the operating modes, the command judgment circuit 132 provides the mode transition information to the mode control circuit 134. Specifically, the command judgment circuit 132 judges whether the command is a command specifying the transition to the first mode shown in Table 1 or a command for specifying the transition to the second mode, to provide the result of judgment as the mode transition information to the mode control circuit 134.

The mode control circuit 134 effects the switching control of the operating modes in response to the mode transition information provided from the command judgment circuit 132. For example, when the mode transition information specifying a change to the first mode is provided, the mode control circuit 134 provides an ON control signal to the command decryption circuit 131 to enable the command decryption function, and provides an OFF control signal to the data scrambling circuit 133 to disable the data scrambling function. This places the command decryption circuit 131 into an operating mode in which the decryption process is executed, and places the data scrambling circuit 133 into an operating mode in which the scrambling process is not executed.

On the other hand, when the mode transition information specifying a change to the second mode is provided, the mode control circuit 134 provides an OFF control signal to the command decryption circuit 131, and provides an ON control signal to the data scrambling circuit 133. This places the command decryption circuit 131 into an operating mode in which the decryption process is not executed, and places the data scrambling circuit 133 into an operating mode in which the scrambling process is executed.

Upon receipt of the mode transition information, the mode control circuit 134 provides mode information to the command judgment circuit 132. Based on the mode information, the command judgment circuit 132 judges the type of the command provided from the command decryption circuit 131. In other words, the command judgment circuit 132 judges the type of the command by reference to the mode information because the command to be judged (that is, the command provided from the information processing apparatus 1) has different command meanings depending on the operating modes if the same code is given.

Next, operations in the respective modes and the mode switching operation will be described. First, the operation of the semiconductor memory 10 (substantially, the memory control section 13) in the first mode will be described.

At the turning-on of the information processing apparatus 1, the semiconductor memory 10 is set so as to operate in the first mode. Thus, when power is turned on, the mode control circuit 134 provides the ON control signal to the command decryption circuit 131, and provides the OFF control signal to the data scrambling circuit 133. Then, when an encrypted command is provided from the information processing apparatus 1 to the semiconductor memory 10, the command is provided through the input/output terminal section 12 to the command decryption circuit 131. At this time, the command decryption circuit 131 is controlled to be ON because the semiconductor memory 10 operates in the first mode. Therefore, the encrypted command is subjected to the decryption process in the command decryption circuit 131, and the decrypted command is provided to the command judgment circuit 132.

The command judgment circuit 132 extracts an instruction code and an address code from the decrypted command to provide a read signal and address data to the memory core section 11. In response to this, data is read from the memory core section 11.

The data read from the memory core section 11 is provided to the data scrambling circuit 133. At this time, the data scrambling circuit 133 is controlled to be OFF because the semiconductor memory 10 operates in the first mode. Therefore, the data read from the memory core section 11 bypasses the scrambling circuit 133 and is outputted from the input/output terminal section 12. The data read from the memory core section 11 is then read into the information processing apparatus 1 through the input/output terminal section 12 and the data buses (not shown). The information processing apparatus 1 executes a process corresponding to the read data (for example, a descrambling process which is the reverse of the scrambling process, or the like in a mode wherein the data read from the semiconductor memory 10 is subjected to the scrambling process and outputted). Subsequently, the information processing apparatus 1 generates commands sequentially and read data, whereby similar operations are repeated.

Next, description will be given on an instance wherein the semiconductor memory 10 operating in the first mode is switched to the second mode, upon receipt of an input of a command for mode switching to the second mode.

Prior to the generation of the command for mode switching to the second mode, the information processing apparatus 1 generates an encrypted command containing control data for initializing the register 135 and a descrambling value to provide the encrypted command to the semiconductor memory 10. This command is provided through the input/output terminal section 12 to the command decryption circuit 131. This encrypted command is decrypted by the command decryption circuit 131, and the command judgment circuit 132 judges that this command is the command for initializing the register 135 (for specifying the setting of the descrambling value). The initializing command and the descrambling value are provided to the register 135 by the mode control circuit 134, and the descrambling value is loaded into the register 135.

Subsequently, when the information processing apparatus 1 outputs the command for mode switching to the second mode, this command is provided through the input/output terminal section 12 to the command decryption circuit 131. At this time, the command decryption circuit 131 is controlled to be ON and is enabled because the semiconductor memory 10 operates in the first mode. Therefore, this command is decrypted in the command decryption circuit 131, and the decrypted command is provided to the command judgment circuit 132.

Because the mode information currently given from the mode control circuit 134 indicates the first mode, the command judgment circuit 132 judges that the inputted command is the command for mode switching to the second mode to provide the mode transition information about the transition to the second mode to the mode control circuit 134. The mode control circuit 134 accordingly controls the command decryption circuit 131 to be OFF and controls the data scrambling circuit 133 to be ON. Thus, the mode switching to the second mode is done. Also, the mode control circuit 134 loads the data about the scrambling value into the register 135 to define the scrambling regularity of the data scrambling circuit 133.

Next, the operation of the semiconductor memory 10 in the second mode will be described. In the second mode, the information processing apparatus 1 generates an unencrypted command to provide the unencrypted command to the semiconductor memory 10. The command in this case principally represents a read address for the memory core section 11. At this time, the command provided from the information processing apparatus 1 bypasses the command decryption circuit 131 (that is, is not decrypted) and is provided to the command judgment circuit 132 because the command decryption circuit 131 is controlled to be OFF (disabled). In response to this, the command judgment circuit 132 extracts an instruction code (a read instruction or a read signal) and address data from the command to provide the instruction code and the address data to the memory core section 11. Thus, data in an addressed memory region are sequentially read from the memory core section 11.

The data read from the memory core section 11 is provided to the data scrambling circuit 133. At this time, the data scrambling circuit 133 is controlled to be ON (enabled) because the memory control section 13 operates in the second mode. Therefore, the data read from the memory core section 11 is subjected to the scrambling process by the data scrambling circuit 133. After the scrambling, the read data is outputted through the input/output terminal section 12 and the data buses to the information processing apparatus 1. The information processing apparatus 1 executes information processing corresponding to the read data. Subsequently, the information processing apparatus 1 generates commands sequentially, whereby the operation in this second mode is repeated.

Specifically, the data read from the semiconductor memory 10 in the second mode is outputted as currently meaningless data because the data stored in the memory core section 11 is scrambled by the data scrambling circuit 133. Thus, the data stored in the memory core section 11 is protected if unauthorized read is done. The information processing apparatus 1, however, uses data obtained by descrambling the above-mentioned data based on the scrambling regularity of the data scrambling circuit 133 because the regularity is known.

Next, description will be given on an instance wherein the semiconductor memory 10 operating in the second mode is switched to the first mode.

The information processing apparatus 1 generates a command for mode switching to the first mode to provide the command for mode switching to the first mode to the semiconductor memory 10. This command is an unencrypted command, and is provided through the input/output terminal section 12 to the command decryption circuit 131. At this time, the command decryption circuit 131 is controlled to be OFF because the semiconductor memory 10 operates in the second mode. Therefore, the command bypasses the command decryption circuit 131 (that is, the command is not decrypted but remains in its current data form) and is provided to the command judgment circuit 132.

The command judgment circuit 132 judges that the inputted command is the command for mode switching to the first mode to provide the mode transition information about the transition to the first mode to the mode control circuit 134. The mode control circuit 134 accordingly switches ON the command decryption circuit 131 and switches OFF the data scrambling circuit 133. Thus, the mode switching to the first mode is done.

The operation of the semiconductor memory 10 according to the first exemplary illustrative non-limiting implementation, that is, the access control of the memory core section 11 by the memory control section 13 is carried out as described above. In the first exemplary implementation, the access control of the semiconductor memory 10 is effected while a mode change (or a mode transition) is made between the first mode in which the command is encrypted and the security strength is high and the second mode in which the data is scrambled and the security strength is low. Thus, a combination of the presence/absence of command encryption and the presence/absence of data scrambling, that is, a data security method changes with time. This makes it difficult to analyze the command types and data scrambling regularity, to provide the security of the data stored in the memory core section 11. Further, the scrambling process, in which the data is made unintelligible by means of the bit manipulation (that is, the replacement of bit positions on the data buses), requires a slight processing burden and short time for the scrambling process. The decryption process, on the other hand, requires processing time but improves the security strength. Thus, combining the first mode in which the security strength is high but the processing burden is heavy and the second mode in which the security strength is low but the processing burden is slight achieves improvements in processing speed while the security strength is maintained high. Additionally, the first exemplary implementation provides difficulties in analyzing a security system to improve the confidentiality of the data stored in the memory core section 11, thereby effectively preventing unauthorized duplication thereof.

{Second Exemplary Illustrative Non-Limiting Implementation}

Figure 5:
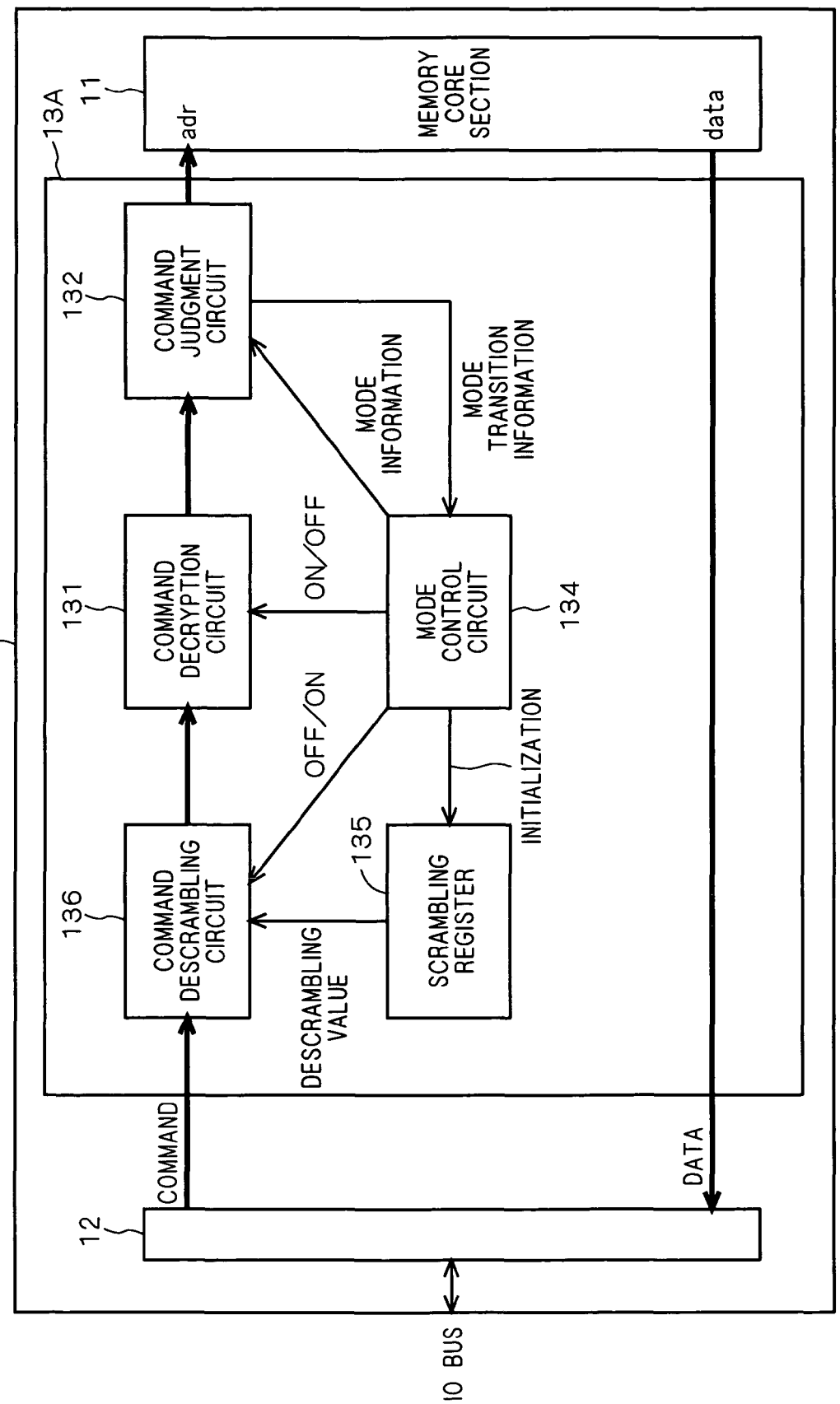
FIG. 5 is a block diagram of an exemplary illustrative non-limiting semiconductor memory.

Next, the construction of a semiconductor memory 10A according to a second exemplary illustrative non-limiting implementation will be described. FIG. 5 is a block diagram of the semiconductor memory 10A. Components similar to those of the first exemplary implementation will not be described.

The semiconductor memory 10A according to the second exemplary illustrative non-limiting implementation differs from the first exemplary implementation in that a memory control section 13A includes a command descrambling circuit 136 in place of the data scrambling circuit 133. Specifically, the second exemplary illustrative non-limiting implementation is constructed so that the data read from the memory core section 11 is not subjected to the bit manipulation, but a command provided from the information processing apparatus 1 is decrypted if the command is encrypted and is subjected to a descrambling process if the command is scrambled. The descrambling value is set in the register 135.

The command descrambling circuit 136 is a circuit for performing the descrambling process on a command provided from the information processing apparatus 1. Thus, a command is subjected to the scrambling process and/or the encryption process when the information processing apparatus 1 provides the command to the semiconductor memory 10, and the command descrambling circuit 136 performs a bit manipulation process so as to convert the command subjected to the scrambling process back into its original command, based on the descrambling value loaded in the register 135. The descrambling value serves as reference data for causing the reverse bit manipulation based on the regularity of the scrambling process of the information processing apparatus 1.

FIG. 6 shows a specific construction of the command descrambling circuit 136. A bus switching circuit 136s is provided at the input circuit of the command descrambling circuit 136. The bus switching circuit 136s receives a switching control signal which turns ON a command descrambling function from the mode control circuit 134 to turn ON the command descrambling circuit 136 (enables the descrambling function), and receives the switching control signal which turns OFF the command descrambling function to turn OFF the command descrambling circuit 136 (disables the descrambling function). Thus, when the command descrambling circuit 136 is ON (or the descrambling function is enabled), the command (encrypted command) inputted through the input/output terminal section 12 is descrambled by the command descrambling circuit 136. When the command descrambling circuit 136 is OFF (or the descrambling function is disabled), the command is provided to the command decryption circuit 131 on the next stage through a bypass line so as to pass without being descrambled.

The semiconductor memory 10A according to this exemplary illustrative non-limiting implementation is switchable between the two operating modes shown in Table 2.

TABLE 2

| Mode | Command Descrambling Circuit | Command Decryption Circuit |
| --- | --- | --- |
| First Mode | OFF | ON |
| Second Mode | ON | OFF |

Next, operations in the respective modes and the mode switching operation will be described. First, the operation of the semiconductor memory 10A in the first mode will be described.

At the turning-on of the information processing apparatus 1, the semiconductor memory 10A is set so as to operate in the first mode. Thus, when power is turned on, the mode control circuit 134 provides the ON control signal to the command decryption circuit 131, and provides the OFF control signal to the command descrambling circuit 136. Then, when an encrypted command is provided from the information processing apparatus 1 to the semiconductor memory 10A, the command is provided through the input/output terminal section 12 to the command descrambling circuit 136. In the first mode, however, the command bypasses the command descrambling circuit 136 and is provided to the command decryption circuit 131 because the command descrambling circuit 136 is controlled to be OFF. At this time, the command is subjected to the decryption process in the command decryption circuit 131 because the command decryption circuit 131 is controlled to be ON. The decrypted command is provided to the command judgment circuit 132. The command judgment circuit 132 extracts an instruction code and an address code from the decrypted command to provide a read signal and address data to the memory core section 11. In response to this, data is read from the memory core section 11, and is outputted through the input/output terminal section 12 and the data buses to the information processing apparatus 1. The information processing apparatus 1 executes information processing in accordance with the read data.

Next, description will be given on an instance wherein the semiconductor memory 10A operating in the first mode is switched to the second mode.

Prior to the generation of the command for mode switching to the second mode, the information processing apparatus 1 generates an encrypted command containing control data for initializing the register 135 and the descrambling value to provide the encrypted command to the semiconductor memory 10A. This command is provided through the input/output terminal section 12 and the command descrambling circuit 136 to the command decryption circuit 131. This encrypted command is decrypted by the command decryption circuit 131, and the command judgment circuit 132 judges that this command is the command for initializing the register 135 (for specifying the setting of the descrambling value). The initializing command and the descrambling value are provided to the register 135 by the mode control circuit 134, and the descrambling value is loaded into the register 135.

Subsequently, the information processing apparatus 1 generates the command for mode switching to the second mode to provide the command for mode switching to the second mode to the semiconductor memory 10A. This command is provided through the input/output terminal section 12 to the command descrambling circuit 136. In the first mode, however, the command bypasses the command descrambling circuit 136 and is provided to the command decryption circuit 131 because the command descrambling circuit 136 is controlled to be OFF. Then, the command is decrypted by the command decryption circuit 131, and the decrypted command is provided to the command judgment circuit 132.

The command judgment circuit 132 judges that the provided command is the command for mode switching to the second mode to provide the mode transition information about the transition to the second mode to the mode control circuit 134. In response to the mode switching command, the mode control circuit 134 controls the command descrambling circuit 136 to be ON, and controls the command decryption circuit 131 to be OFF, thereby switching the mode to the second mode.

This causes the semiconductor memory 10A to subsequently operate in the second mode. Next, the operation in the second mode will be described. The information processing apparatus 1 generates an unencrypted and scrambled command to provide the command to the semiconductor memory 10A. This scrambled command is provided through the input/output terminal section 12 to the command descrambling circuit 136. In this second mode, the command descrambling circuit 136 is controlled to be ON, and the command decryption circuit 131 is controlled to be OFF. Therefore, the scrambled command is subjected to the descrambling process by the command descrambling circuit 136. Thereafter, the command bypasses the command decryption circuit 131, and is provided to the command judgment circuit 132.

The command judgment circuit 132 obtains an instruction code and an address code from the command to provide a read signal and address data to the memory core section 11. In response to this, data is outputted from the memory core section 11.

The data outputted from the memory core section 11 is outputted through the input/output terminal section 12 and the data buses to the information processing apparatus 1. The information processing apparatus 1 executes information processing in accordance with the read data. Subsequently, the information processing apparatus 1 generates commands sequentially, whereby the operation in this second mode is repeated.

Next, description will be given on an instance wherein the semiconductor memory 10A operating in the second mode is switched to the first mode.

When the information processing apparatus 1 generates the command (scrambled command) for mode switching to the first mode to provide the command for mode switching to the first mode to the semiconductor memory 10A, this command is provided through the input/output terminal section 12 to the command descrambling circuit 136. At this time, the command descrambling circuit 136 is controlled to be ON and the command decryption circuit 131 is controlled to be OFF because the semiconductor memory 10A is in the second mode. Therefore, the scrambled command is descrambled by the descrambling circuit 136. Thereafter, this command bypasses the command decryption circuit 131 and is provided to the command judgment circuit 132.

The command judgment circuit 132 judges that the inputted command is the command for mode switching to the first mode to provide the mode transition information about the transition to the first mode to the mode control circuit 134. The mode control circuit 134 accordingly controls the command descrambling circuit 136 to be OFF, and controls the command decryption circuit 131 to be ON. Thus, the mode of the memory control section 13A is switched to the first mode.

The operation of the semiconductor memory 10A according to the second exemplary illustrative non-limiting implementation, that is, the access control of the memory core section 11 by the memory control section 13A is carried out as described above. In the second illustrative implementation, the access control of the memory core section 11 is effected while a mode change (or a mode transition) is made between the first mode in which the command is encrypted and the security strength is high and the second mode in which the command is scrambled and the security strength is low. Thus, a command security method using a combination of the presence/absence of command encryption and the presence/absence of command descrambling changes with time. This makes it difficult to analyze the command types and command descrambling regularity, to provide the security of the data stored in the memory core section 11. Further, combining the first mode in which the security strength is high but the processing burden is heavy and the second mode in which the security strength is low but the processing burden is slight achieves improvements in processing speed while the security strength is maintained high.

{Third Exemplary Illustrative Non-Limiting Implementation}

Figure 7:
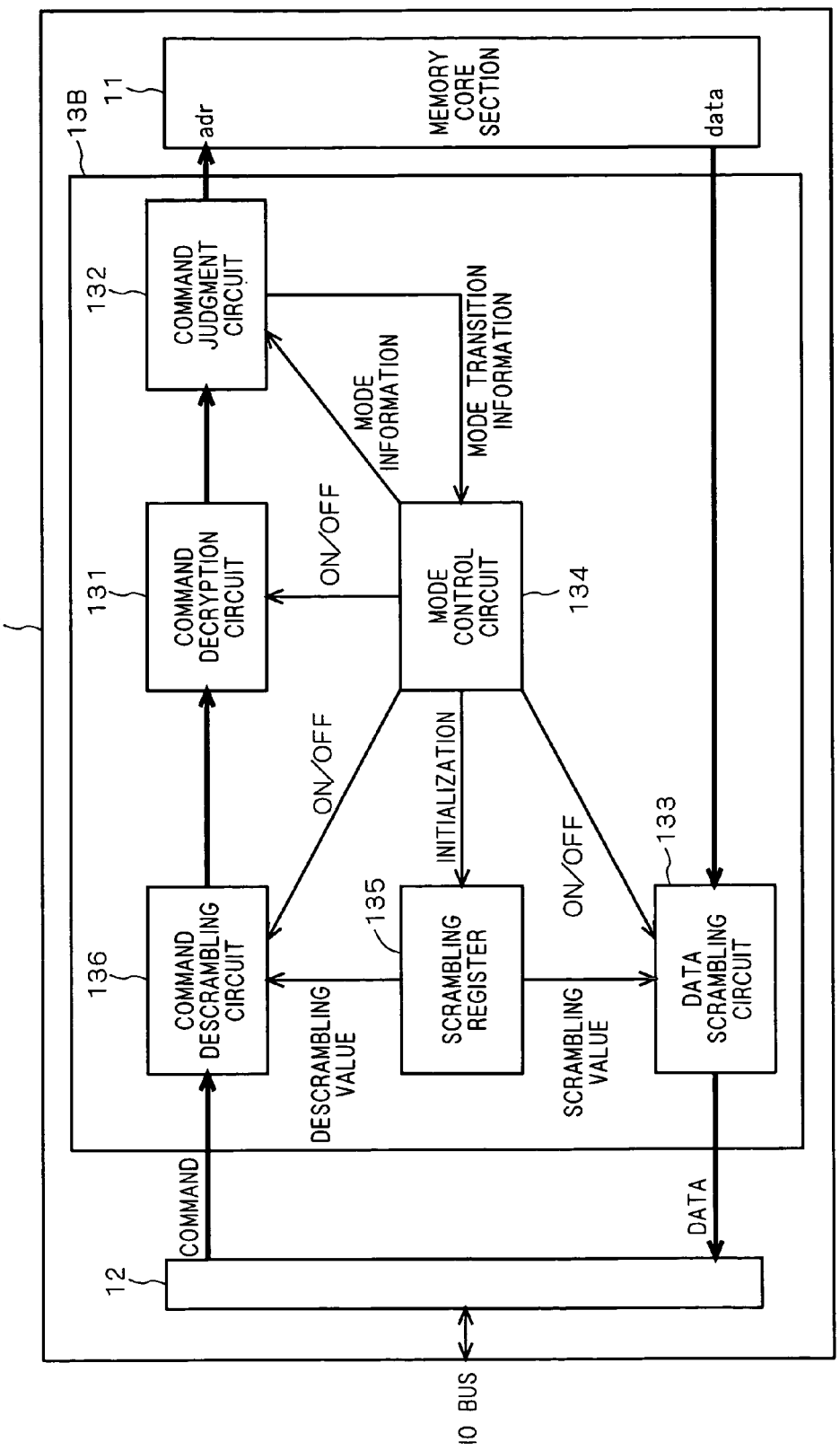
FIG. 7 is a block diagram of an exemplary illustrative non-limiting semiconductor memory.

Next, the construction of a semiconductor memory 10B according to a third exemplary implementation will be described. FIG. 7 is a circuit block diagram of the semiconductor memory 10B. Components similar to those of the first and second exemplary non-limiting implementations will not be described.

The semiconductor memory 10B according to the third exemplary illustrative non-limiting implementation is constructed such that the first exemplary implementation and the second exemplary implementation are combined together. Specifically, the memory control section 13 includes both the data scrambling circuit 133 and the command descrambling circuit 136.

The semiconductor memory 10B according to the third exemplary illustrative non-limiting implementation is operable while switching between the two operating modes shown in Table 3. That is, in the first mode, the command descrambling circuit 136 is controlled to be OFF, the command decryption circuit 131 is controlled to be ON, and the data scrambling circuit 133 is controlled to be either ON or OFF. In the second mode, the command descrambling circuit 136 is controlled to be OFF, the command decryption circuit 131 is controlled to be either ON or OFF, and the data scrambling circuit 133 is controlled to be ON.

TABLE 3

| Mode | Command Descrambling Circuit | Command Decryption Circuit | Data Scrambling Circuit |
| --- | --- | --- | --- |
| First Mode | OFF | ON | ON/OFF |
| Second Mode | OFF | ON/OFF | ON |

Also in this exemplary illustrative non-limiting implementation, the semiconductor memory 10B is set so as to operate in the first mode at the turning-on of the information processing apparatus 1. Thus, when power is turned on, the mode control circuit 134 provides the ON control signal to the command decryption circuit 131, provides the OFF control signal to the command descrambling circuit 136, and provides the ON control signal to the data scrambling circuit 133. Then, when an encrypted command is provided from the information processing apparatus 1 to the semiconductor memory 10B, the command bypasses the command descrambling circuit 131, and is subjected to the decryption process in the command decryption circuit 131. Thereafter, the command is provided to the command judgment circuit 132. The command judgment circuit 132 extracts a read signal and address data from the decrypted command to provide the read signal and the address data to the memory core section 11. In response to this, data stored at a given address is read from the memory core section 11. The read data is outputted to the information processing apparatus 1 after being subjected to the scrambling process in the data scrambling circuit 133 (or directly without being subjected to the scrambling process if the data scrambling circuit 133 is controlled to be OFF).

When the semiconductor memory 10B receives the command for mode switching to the second mode from the information processing apparatus 1 while operating in the first mode, the mode control circuit 134 controls the command descrambling circuit 136 to be OFF and controls the data scrambling circuit 133 to be ON, thereby switching to the second mode. The command decryption circuit 131 is turned either ON or OFF. Whether to turn ON or OFF the command decryption circuit 131 is controlled by a program (a command stored at an address) stored in the memory core section 11.

On the other hand, when the semiconductor memory 10B operates in the second mode, the command provided from the information processing apparatus 1 bypasses the command descrambling circuit 136, and is provided to the command decryption circuit 131. This command is provided to the command judgment circuit 132 after being subjected to the decryption process (or directly without being subjected to the decryption process). The command judgment circuit 132 extracts a read signal and address data from the command to provide a read address to the memory core section 11. In response to this, data stored in a storage region of the memory core section 11 specified by the read address are sequentially read. The read data is scrambled by the data scrambling circuit 133, and is then outputted to the information processing apparatus 1.

When the command for mode switching to the first mode is provided from the information processing apparatus 1 during the operation in the second mode, the mode control circuit 134 controls the command descrambling circuit 136 to be OFF, controls the command decryption circuit 131 to be ON, and controls the data scrambling circuit 133 to be either ON or OFF.

Also in the third exemplary illustrative non-limiting implementation, the read operation of the semiconductor memory 10B is carried out while a mode change (or a mode transition) is made between the first mode in which the command is encrypted and the security strength is high and the second mode in which the data is scrambled and the security strength is low. Thus, a security method for the command and data (that is, whether to decrypt the command and the presence/absence of data scrambling) changes with time. This makes it difficult to analyze the command and data. Further, combining the first mode in which the security strength is high but the processing burden is heavy and the second mode in which the security strength is low but the processing burden is slight achieves improvements in processing speed while the security strength is maintained high. Because of the individual selective adoption of the data scrambling process in the first mode and the command decryption process in the second mode, the time when the data scrambling and the command decryption processes are performed is unintelligible even in the same mode. This makes it more difficult to analyze the circuits in the sections. In the second mode, the command descrambling circuit 136 may be ON and the data scrambling circuit 133 may be OFF. That is, similar effects are produced when the relation between ON and OFF of the two circuits 136 and 133 shown in Table 3 is reversed.

The construction of the semiconductor memory 10 according to fourth to sixth exemplary implementations below is similar to the circuit construction of the semiconductor memory 10B of the third exemplary illustrative non-limiting implementation shown in FIG. 7, but differs only in control method in the operating modes. Thus, the details of the operation of the semiconductor memory 10B will be described in the following exemplary implementations.

{Fourth Exemplary Illustrative Non-Limiting Implementation}

The semiconductor memory 10B according to the fourth exemplary illustrative non-limiting implementation is operable while switching between the two operating modes as shown in Table 4. This preferred exemplary illustrative non-limiting implementation is similar to the third exemplary implementation except that the command descrambling circuit 136 is controlled to be ON in the second mode.

TABLE 4

| Mode | Command Descrambling Circuit | Command Decryption Circuit | Data Scrambling Circuit |
|---|---|---|---|
| First Mode | OFF | ON | ON/OFF |
| Second Mode | ON | ON/OFF | ON |

Specifically, in the first mode according to the fourth exemplary illustrative non-limiting implementation, the command descrambling circuit 136 is turned OFF, the command decryption circuit 131 is turned ON, and the data scrambling circuit 133 is turned either ON or OFF. A command for such control is provided from the information processing apparatus 1 to the semiconductor memory 10B, and control is effected as in the first mode of Table 4 by the cooperative actions of the command judgment circuit 132 and the mode control circuit 134.

For mode switching to the second mode, on the other hand, a command for turning ON the command descrambling circuit 136, for turning ON or OFF the command decryption circuit 131 and for turning ON the data scrambling circuit 133 is provided from the information processing apparatus 1, and control is effected as in the second mode of Table 4 by the cooperative actions of the command judgment circuit 132 and the mode control circuit 134.

In the first mode in which the security strength is high according to the fourth exemplary implementation, the command is encrypted, and the data is scrambled on some occasions and is not on other occasions. In the second mode in which the security strength is low, the command and data are scrambled, and the command is encrypted on some occasions and is not on other occasions. Further, the access control of the memory core section 11 is effected while a mode change is made between the first mode and the second mode. This makes it difficult to analyze the scrambling or descrambling regularity and the command, to provide the security of the data stored in the semiconductor memory 10B.

{Fifth Preferred Exemplary Illustrative Non-Limiting Implementation}

The semiconductor memory 10B according to the fifth exemplary illustrative non-limiting implementation is operable while switching between the two operating modes as shown in Table 5. In the first mode, the command descrambling circuit 136 is controlled to be either ON or OFF, and the command decryption circuit 131 and the data scrambling circuit 133 are controlled to be ON. In the second mode, the command descrambling circuit 136 and the data scrambling circuit 133 are controlled to be ON, and the command decryption circuit 131 is controlled to be either ON or OFF.

TABLE 5

| Mode | Command Descrambling Circuit | Command Decryption Circuit | Data Scrambling Circuit |
|---|---|---|---|
| First Mode | ON/OFF | ON | ON |
| Second Mode | ON | ON/OFF | ON |

Also in the fifth exemplary non-limiting implementation, the semiconductor memory 10B is operated while a mode change is made between the first mode in which the command is encrypted, the data is scrambled and the security strength is high and the second mode in which the command and data are scrambled and the security strength is lower than that of the first mode.

{Sixth Exemplary Illustrative Non-Limiting Implementation}

The semiconductor memory 10B according to the sixth exemplary implementation is operable while switching between the two operating modes as shown in Table 6. This implementation is similar to the fifth exemplary implementation except that the data scrambling circuit 133 is controlled to be OFF in the first mode, and will not be described in detail.

TABLE 6

| Mode | Command Descrambling Circuit | Command Decryption Circuit | Data Scrambling Circuit |
|---|---|---|---|
| First Mode | ON/OFF | ON | OFF |
| Second Mode | ON | ON/OFF | ON |

Also in the sixth exemplary illustrative non-limiting implementation, the semiconductor memory 10B is operated while a mode change is made between the first mode in which the command is encrypted and the security strength is high and the second mode in which the command and data are scrambled and the security strength is lower than that of the first mode.

The fourth to sixth exemplary implementations are described above. In each of the fourth to sixth exemplary implementations, the access control of the semiconductor memory 10B is effected while the mode change is made between the first mode in which the security strength is high and the second mode in which the security strength is low. Thus, a security method for the command and data changes with time. This makes it difficult to analyze the command and data. Further, the scrambling process, which is a method of making the data unintelligible by means of the bit operation or the bit manipulation, requires a slight processing burden. Combining the first mode in which the security strength is high but the processing burden is heavy and the second mode in which the security strength is low but the processing burden is slight achieves improvements in processing speed while the security strength is maintained high.

The third to sixth exemplary illustrative non-limiting implementations may provide a variety of patterns of the operating modes by controlling the command decryption circuit 131 to be either ON or OFF in the second mode. It is, however, preferred to control the command decryption circuit 131 to be OFF in order to reduce the processing burden in the second mode as discussed above.

{Other Exemplary Illustrative Non-Limiting Implementations}

Functions to be described below may be added to any of the semiconductor memory 10, 10A or 10B according to exemplary illustrative non-limiting implementations to enhance the security of data.

<1. Initialization Process for Scrambling>

The mode control circuit is adapted to update the value stored in the register 135 during the operation in the first mode in which the security strength is high. Specifically, the value stored in the register 135 is the descrambling value for determining the descrambling regularity in the case where the command descrambling circuit 136 performs the command descrambling process, and is the scrambling value for determining the scrambling regularity in the case where the data scrambling circuit 133 performs the data scrambling process. This value (scrambling value or descrambling value) is made settable not only at the turning-on of the information processing apparatus 1 but also during the first mode by program processing.

Specifically, the command descrambling circuit 136 performs a bit manipulation (exclusive-OR operation or the like) on the descrambling value provided from the register 135 and the command provided from the information processing apparatus 1. The data scrambling circuit 133 performs a bit manipulation (exclusive-OR operation or the like) on the scrambling value provided from the register 135 and the data read from the memory core section 11. Thus, changing the setting of the register 135 allows a change in command input relationship or in data output relationship. This enhances the security strength even in the scrambling process which is lower in security strength than the encryption process.

In this exemplary implementation as described above, even if the structure of a scrambling circuit constituting the command descrambling circuit 136 or the data scrambling circuit 133 comes to light, it is impossible to analyze the regularity of the command descrambling and/or the data scrambling without analyzing the time when the command descrambling value and/or the data scrambling value is changed. This makes the analysis more difficult. Thus, even if the circuit structure of the command descrambling circuit 136 or the data scrambling circuit 133 is analyzed, the unauthorized read of the data stored in the semiconductor memory 10 requires the analysis of the time when the descrambling value or the descrambling value is generated in the first mode. This compensates for the low security strength in the second mode.

<2. Abnormal Operating Mode>

Next, operation in a third mode will be described. As mentioned above, the decryption process or the descrambling process is executed on the command provided from the information processing apparatus 1 in the first mode and in the second mode. If a proper command, that is, a command generated using an encryption algorithm or a scrambling algorithm synchronized with the decryption algorithm or the descrambling algorithm of the semiconductor memory 10, 10A or 10B is provided, the command judgment circuit 132 can properly judge the descriptions of the command. If the command judgment circuit 132 receives a command subjected to an unsynchronized unauthorized encryption process or scrambling process, the command judgment circuit 132 judges that the command after the decryption process or the descrambling process as an abnormal command. When the command itself is unauthorized even if the encryption process or the scrambling process is performed properly, the command judgment circuit 132 also judges that the command is an abnormal command.

Figure 8:
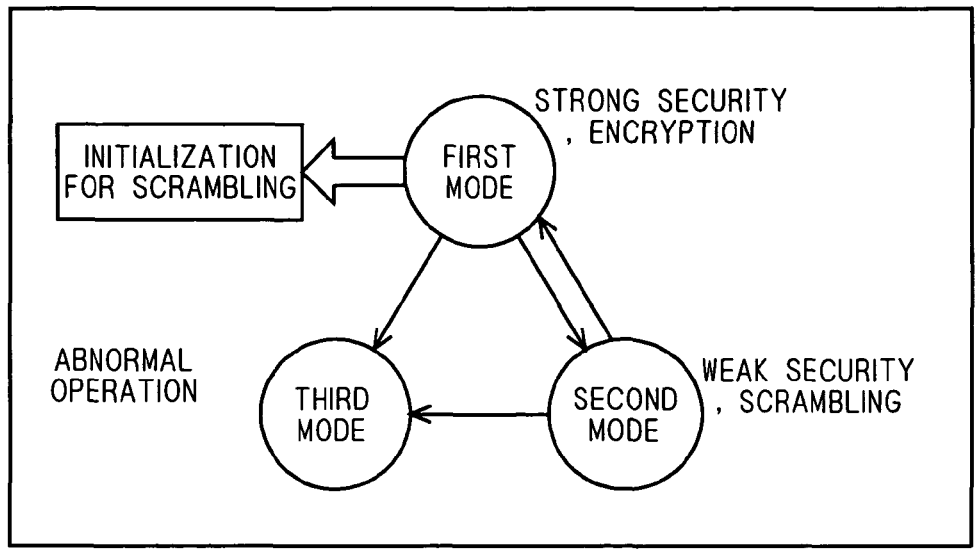
FIG. 8 is a transition diagram of exemplary illustrative non-limiting operating modes.

When the command is judged as abnormal, the command judgment circuit 132 changes the mode of the semiconductor memory 10, 10A or 10B to the third mode which is the abnormal operating mode. After the transition to the third mode, the command judgment circuit 132 effects control so as to inhibit the process of accessing the memory core section 11. FIG. 8 shows a relationship between the first to third modes.

Once having changed to the third mode, the semiconductor memory 10 (or 10A or 10B) is not able to make a transition to the other modes. The command judgment circuit 132 inhibits access to the memory core section 11, and does not generate the mode transition information about the transition to the other modes.

Therefore, when the command subjected to the unauthorized encryption process (or the unauthorized command) or the unauthorized scrambling process is provided to the semiconductor memory 10, 10A or 10B, the semiconductor memory 10, 10A or 10B immediately makes a transition to the third mode, and subsequently access to the memory core section 11 is inhibited. This enhances the security strength against unauthorized acts to reduce the observability of signals, thereby making the unauthorized read of the data more difficult.

<3. Control Mainly Using Second Mode>

Although the semiconductor memories 10, 10A and 10B according to exemplary illustrative implementations have the plurality of operating modes as described above, the information processing apparatus 1 effects control so that the semiconductor memories 10, 10A and 10B operate mainly in the second mode in order to balance the security strength and performance. A command may be provided to the semiconductor memory 10, 10A or 10B for transition to the first mode at predetermined time intervals or after a lapse of time specified by an application program operating in the information processing apparatus 1.

In other words, setting the operating time of the second mode longer than that of the first mode improves the performance of the information processing apparatus 1. Making a transition to the first mode in which the security strength is high in a certain timed relationship enhances the security strength and initialization for the scrambling process in the first mode compensates for the security strength after the transition back to the second mode. This maintains a relatively high security strength and provides a relatively short read time on average for all operating times of the information processing apparatus 1.

<4. Management of Memory Regions Depending on Operating Modes>

The semiconductor memories 10, 10A and 10B according to exemplary illustrative non-limiting implementations have the plurality of operating modes corresponding to different security levels as mentioned above. Additionally, different memory regions (or spaces) accessible depending on the modes may be set.

Figure 9:
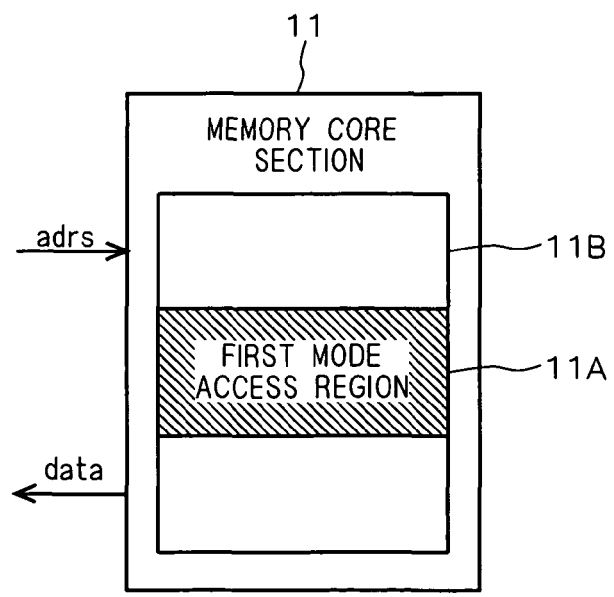
FIG. 9 is a diagram showing an exemplary illustrative non-limiting memory map in which storage regions are managed depending on the operating modes.

FIG. 9 shows storage regions of the memory core section 11 in diagrammatic form. An accessible region and an inaccessible region depending on the modes are defined in the memory core section 11. For example, a storage region 11A is a region determined to be accessible only in the first mode, and a storage region 11B other than the storage region 11A is a region determined to be accessible in all of the modes. Thus making the storage regions of the memory core section 11 definable as the accessible and inaccessible regions depending on the modes further strengthens the security of important data, for example, by storing the data requiring the highest security in the region 11A.

In the method of managing the storage regions of the memory core section 11 shown in FIG. 9, the storage region 11A accessible in the first mode and the storage region 11B accessible also in other modes are managed in distinction from each other. This is an example, and other types of storage region management are conceivable. For example, the memory core section 11 may be divided into a plurality of storage regions. These storage regions may be independently defined as storage regions accessible in the respective mode. One of the storage regions may be defined as an accessible storage region common to the two modes: the first mode and the second mode.

<5. Command with Return Condition>

Next, a command with a return condition will be described. The command with the return condition generated by the information processing apparatus 1 is a command for specifying temporarily changing the current operating mode of the semiconductor memory 10, 10A or 10B to a different mode and then returning the current operating mode back to the original mode again after a lapse of predetermined time. This command with the return condition is a command, for example, which indicates "changing the current mode (the first mode) to the second mode, and changing to the first mode again after ten seconds" and the like. The command with the return condition contains information about the mode type to which a transition is temporarily made and information specifying the length of time for the transition.

Thus, all of the commands for changing the modes are controlled so as to be accepted and processed only in the first mode having the highest security level. In other words, all of the mode changes are carried out so as to make a transition from the first mode to another mode and then return to the first mode after a lapse of specified time.

<6. Modifications>

The information processing apparatus 1 to and from which the semiconductor memories 10, 10A and 10B according to the exemplary non-limiting implementations described hereinabove are attached and removed is applicable specifically to a personal computer, a handheld terminal apparatus such as a PDA, an image processing apparatus, a game apparatus (including portable and stationary types), a portable telephone, and the like. The exemplary illustrative non-limiting implementations described in this application may be used as a semiconductor memory removable from any of these apparatuses.

A circuit construction in the above-mentioned exemplary implementations is such that the command provided from the information processing apparatus 1 is inputted first to the command descrambling circuit 136 and is inputted then to the command decryption circuit 131. The sequence in which the circuits are connected may be reversed (the construction is such that the command decryption is performed first).

In the above-mentioned exemplary implementations, the command descrambling circuit 136 and the data scrambling circuit 133 share the use of the single register 135. However, individual registers may be provided for the command descrambling circuit 136 and the data scrambling circuit 133, respectively, to independently load the descrambling value and the scrambling value into the individual registers.

The semiconductor memories 10, 10A and 10B are shown as incorporating the memory control section 13 in the above-mentioned exemplary implementations. The memory control section 13, however, need not always be constructed integrally with the memory core section 11. For example, a general-purpose mask ROM may be used in place of the memory core section 11. In such a case, a circuit having a function similar to that of the memory control section 13 of exemplary illustrative non-limiting implementations described herein is added externally in association with the mask ROM. Such a construction can provide the security of the data stored in the general-purpose ROM.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

What is claimed is:

1. A semiconductor memory device removably mountable to an information processing apparatus, said semiconductor memory device comprising:
    a memory core section structured to store therein data including a program to be protected, said memory core section including an address input section and a data output section;
    an input/output terminal section including command input terminals structured to receive a command including an instruction code and address data from said information processing apparatus, and data output terminals arranged to provide data read from said memory core section to said information processing apparatus; and
    a memory control section connected between said memory core section and said input/output terminal section,
    wherein said memory control section includes
        a command decryption circuit arranged to be selectively operative to decrypt the command provided to said command input terminals or to output the command without processing,
        a scrambling circuit structured to be selectively operative to scramble the data read from said memory core section or to output the data without processing,
        a command judgment circuit structured to judge whether the command provided from said information processing apparatus is a first command specifying a transition to a first operating mode or a second command specifying a transition to a second operating mode,
        an operating mode control circuit structured to select the first operating mode for enabling a command decryption function of said command decryption circuit in response to a judgment made by said command judgment circuit that the command is the first command, and structured to select the second operating mode for enabling a scrambling function of said scrambling circuit in response to a judgment made by said command judgment circuit that the command is the second command, and
        a descrambling circuit arranged to be selectively operative to pass the command provided to said command input terminals without processing therethrough or descramble the command, and
    wherein said operating mode control circuit disables a descrambling function said descrambling circuit when said first operating mode is selected.

2. The semiconductor memory device according to claim 1, wherein said operating mode control circuit enables the descrambling function of said descrambling circuit when said second operating mode is selected.

3. The semiconductor memory device according to claim 1, wherein said input/output terminal section includes a predetermined number of dual-purpose terminals used as both said command input terminals and said data output terminals by switching therebetween in a time-sharing manner.

4. The semiconductor memory device according to claim 1, wherein said memory control section includes a register for setting a scrambling condition of said scrambling circuit, and
    wherein said operating mode control section updates the contents of said register during an operation in said first operating mode.

5. The semiconductor memory device according to claim 1, said semiconductor memory device being controlled by a command provided from said information processing apparatus so that a period of operation in said second operating mode is longer than a period of operation in said first operating mode.

6. A semiconductor memory device removably mountable to an information processing apparatus, said semiconductor memory device comprising:
    a memory core section structured to store therein data including a program to be protected, said memory core section including an address input section and a data output section;
    an input/output terminal section including command input terminals structured to receive a command including an instruction code and address data from said information processing apparatus, and data output terminals arranged to provide data read from said memory core section to said information processing apparatus; and a memory control section connected between said memory core section and said input/output terminal section, wherein said memory control section includes a descrambling circuit structured to be selectively operative to descramble the command provided to said command input terminal or to output the command without processing, a command decryption circuit arranged to be selectively operative to decrypt the command provided to said command input terminals or to output the command without processing, a command judgment circuit arranged to judge whether the command provided from said information processing apparatus is a first command specifying a transition to a first operating mode or a second command specifying a transition to a second operating mode, and an operating mode control circuit structured to select the first operating mode for enabling a command decryption function of said command decryption circuit in response to a judgment made by said command judgment circuit that the command is the first command, and structured to select the second operating mode for enabling a descrambling function of said descrambling circuit in response to a judgment made by said command judgment circuit that the command is the second command, and a scrambling circuit arranged to be selectively operative to scramble the data read from said memory core section or to output the data read from memory core section without processing, and wherein said operating mode control circuit enables a scrambling function of said scrambling circuit when said second operating mode is selected.

7. The semiconductor memory device according to claim 6, wherein said operating mode control circuit disables the scrambling function of said scrambling circuit when said first operating mode is selected.

8. The semiconductor memory device according to claim 6, wherein said memory control section includes a register for setting a descrambling condition of said descrambling circuit, and wherein said operating mode control circuit updates the contents of said register during an operation in said first operating mode.

9. The semiconductor memory device according to claim 6, wherein said input/output terminal section includes a predetermined number of dual-purpose terminals used as both said command input terminals and said data output terminals by switching therebetween in a time-sharing manner.

10. The semiconductor memory device according to claim 6, wherein said memory control section includes a register for setting a scrambling condition of said scrambling circuit, and wherein said operating mode control circuit updates the contents of said register during an operation in said first operating mode.

11. The semiconductor memory device according to claim 6, said semiconductor memory device being controlled by a command provided from said information processing apparatus so that a period of operation in said second operating mode is longer than a period of operation in said first operating mode.

12. A semiconductor memory device removably mountable to an information processing apparatus, said semiconductor memory device comprising:

a memory core section structured to store therein data including a program to be protected, said memory core section including an address input section and a data output section;

an input/output terminal section including command input terminals structured to receive a command including an instruction code and address data from said information processing apparatus, and data output terminals structured to provide data read from said memory core section to said information processing apparatus; and a memory control section connected between said memory core section and said input/output terminal section, wherein said memory control section includes a descrambling circuit structured to be selectively operative to descramble the command provided to said command input terminal or to output the command without processing, a command decryption circuit arranged to be selectively operative to decrypt the command provided to said command input terminals or to output the command without processing, a scrambling circuit structured to be selectively operative to scramble the data read from said memory core section or to output the data without processing, a command judgment circuit structured to judge whether the command provided from said information processing apparatus is a first command specifying a transition to a first operating mode or a second command, specifying a transition to a second operating mode, and an operating mode control circuit structured to select the first operating mode for enabling a command decryption function of said command decryption circuit in response to a judgment made by said command judgment circuit that the command is the first command, and structured to select the second operating mode for enabling a scrambling function of said scrambling circuit in response to a judgment made by said command judgment circuit that the command is the second command.

13. The semiconductor memory device according to claim 12, wherein said operating mode control circuit enables both of the functions of said descrambling circuit and said, scrambling circuit in response to the judgment made by said command judgment circuit that the command is the second command.

14. The semiconductor memory device according to claim 12, wherein said operating mode control circuit enables the scrambling function of said scrambling circuit in response to the judgment made by said command judgment circuit that the command is the first command.

15. The semiconductor memory device according to claim 12, wherein said input/output terminal section includes a predetermined number of dual-purpose terminals used as both said command input terminals and said data output terminals by switching therebetween in a time-sharing manner.

16. The semiconductor memory device according to claim 12, wherein said memory control section includes a register for setting a scrambling condition of said scrambling circuit, and wherein said operating mode control circuit updates the contents of said register during an operation in said first operating mode.

17. The semiconductor memory device according to claim 12, said semiconductor memory device being controlled by a command provided from said information processing apparatus so that a period of operation in said second operating mode is longer than a period of operation in said first operating mode.

18. A memory controller for use with a semiconductor memory device that is removably mountable to an information processing apparatus, said semiconductor memory device including a memory core, said memory controller comprising:

a command decryption circuit configured to decrypt a command from said information processing apparatus when an operation mode of said semiconductor memory device is a first mode having high data security strength, and pass the command through without decrypting when the operation mode is a second mode different from said first mode as having a lower data security strength;

a scrambling circuit configured to be selectively operative to scramble data read from said memory core or to output the data without processing;

a command judgment circuit configured to receive the command from said command decryption circuit, provide signals to enable reading of the data stored in the memory core when the received command is a read command, and provide a mode transition information when the received command is a mode switch command; and an operating mode control circuit configured to receive the mode transition information from said command judgment circuit and to switch the operation mode to a selected one of the first or the second mode based on the received mode transition information, and a descrambling circuit arranged to be selectively operative to pass the command from said information processing apparatus without processing therethrough or to descramble the command, and wherein said operating mode control circuit disables a descrambling function of said descrambling circuit when said first mode is selected.

* * * * *